United States Patent [19]

Swinehart et al.

[11] Patent Number: 4,551,763
[45] Date of Patent: Nov. 5, 1985

[54] DIAGONAL SWEEP SHUTTER MECHANISM FOR VIDEO TAPE CAMERA

[75] Inventors: Steven L. Swinehart; Werner H. Kuhn, both of Albuquerque, N. Mex.

[73] Assignee: Nisus Video Incorporated, Albuquerque, N. Mex.

[21] Appl. No.: 562,280

[22] Filed: Dec. 16, 1983

[51] Int. Cl.$^4$ ............................................. H01N 5/30
[52] U.S. Cl. ................................ 358/225; 358/209; 358/55; 352/216
[58] Field of Search ............... 358/225, 55, 226, 54, 358/209; 352/216, 217, 208, 210, 212, 211

[56] References Cited

U.S. PATENT DOCUMENTS

| | | | |
|---|---|---|---|
| 1,115,196 | 10/1914 | Hermand | 352/209 |
| 1,525,346 | 2/1925 | Warren | 352/216 |
| 1,845,519 | 2/1932 | Richard | 352/210 |
| 3,303,271 | 2/1967 | Hecker | 358/225 |
| 3,490,835 | 1/1970 | Nemeth | 352/141 |
| 3,499,109 | 3/1970 | Kihara et al. | 358/225 |
| 3,715,486 | 2/1973 | Wright et al. | 178/7.2 |
| 3,787,116 | 1/1974 | Shimizu | 352/141 |
| 3,820,145 | 6/1974 | Gaullier | 354/250 |
| 4,171,529 | 10/1979 | Silverberg et al. | 358/209 |
| 4,257,693 | 3/1981 | Hirata et al. | 352/209 |
| 4,284,332 | 8/1981 | Sekine | 352/208 |
| 4,301,476 | 11/1981 | Keller et al. | 358/209 |
| 4,322,140 | 3/1982 | Takimoto et al. | 352/91 C |

FOREIGN PATENT DOCUMENTS

| | | |
|---|---|---|
| 737275 | 9/1955 | United Kingdom . |
| 1139580 | 1/1969 | United Kingdom . |
| 1377928 | 12/1974 | United Kingdom . |

*Primary Examiner*—Gene Z. Rubinson
*Assistant Examiner*—Robert Lev
*Attorney, Agent, or Firm*—Harness, Dickey & Pierce

[57] ABSTRACT

A focal plane shutter for a video camera has a pair of disks rotated in the same direction about a common axis in synchronism with the raster scan blanking interval. The disks have openings which overlie one another and define a light admitting shutter aperture positioned to illuminate the video pickup. Each opening is bounded on first and second sides by lines emanating from a point on the disk which is offset from the disk's axis of rotation preferably by a distance equal to the length of the diagonal of the raster. This enables an even exposure of the video pickup, of equal areas at equal times, no matter where the pickup is positioned relative to the disk's axis of rotation.

8 Claims, 27 Drawing Figures

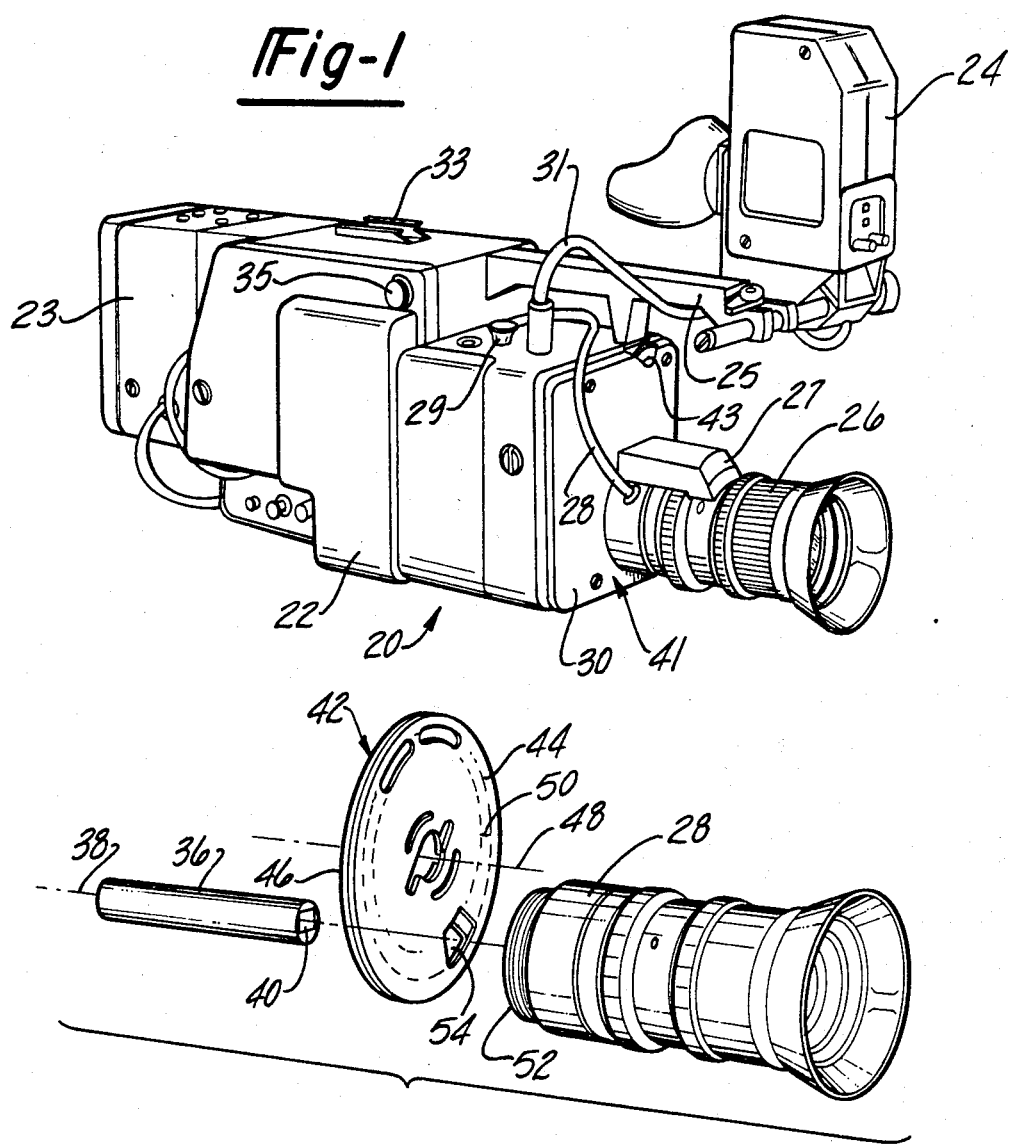

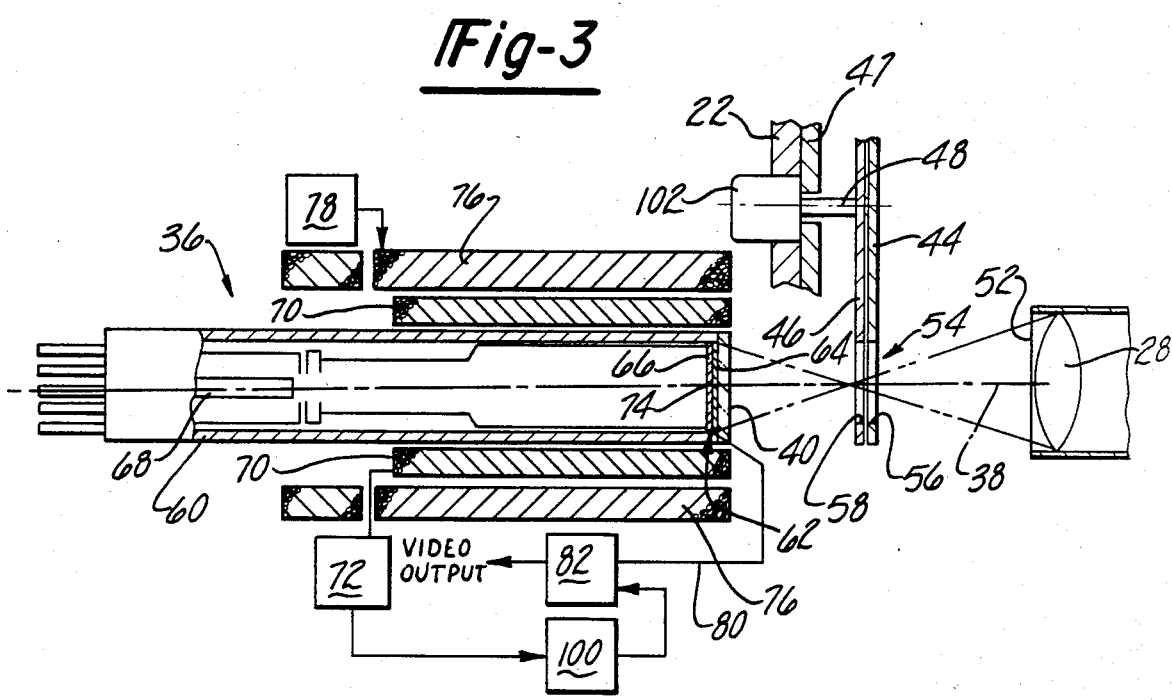
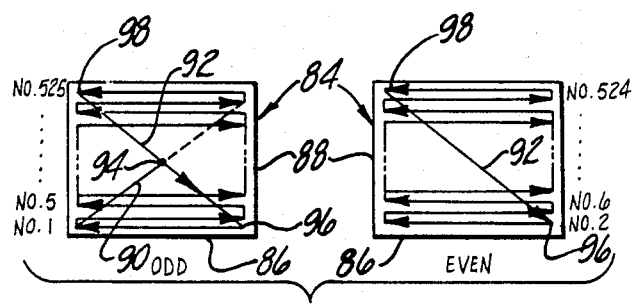
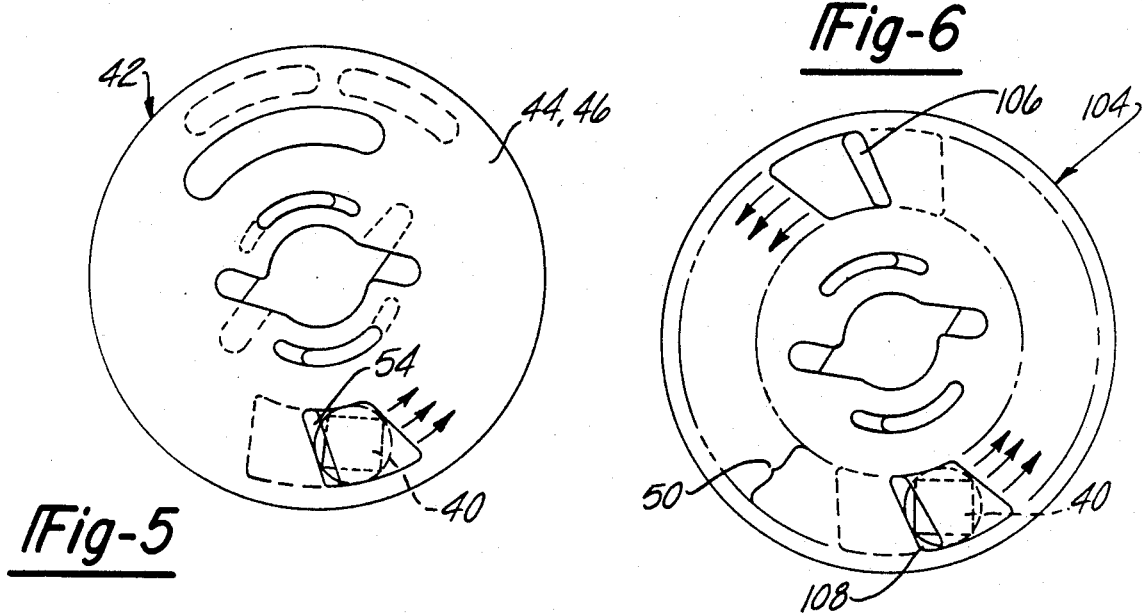

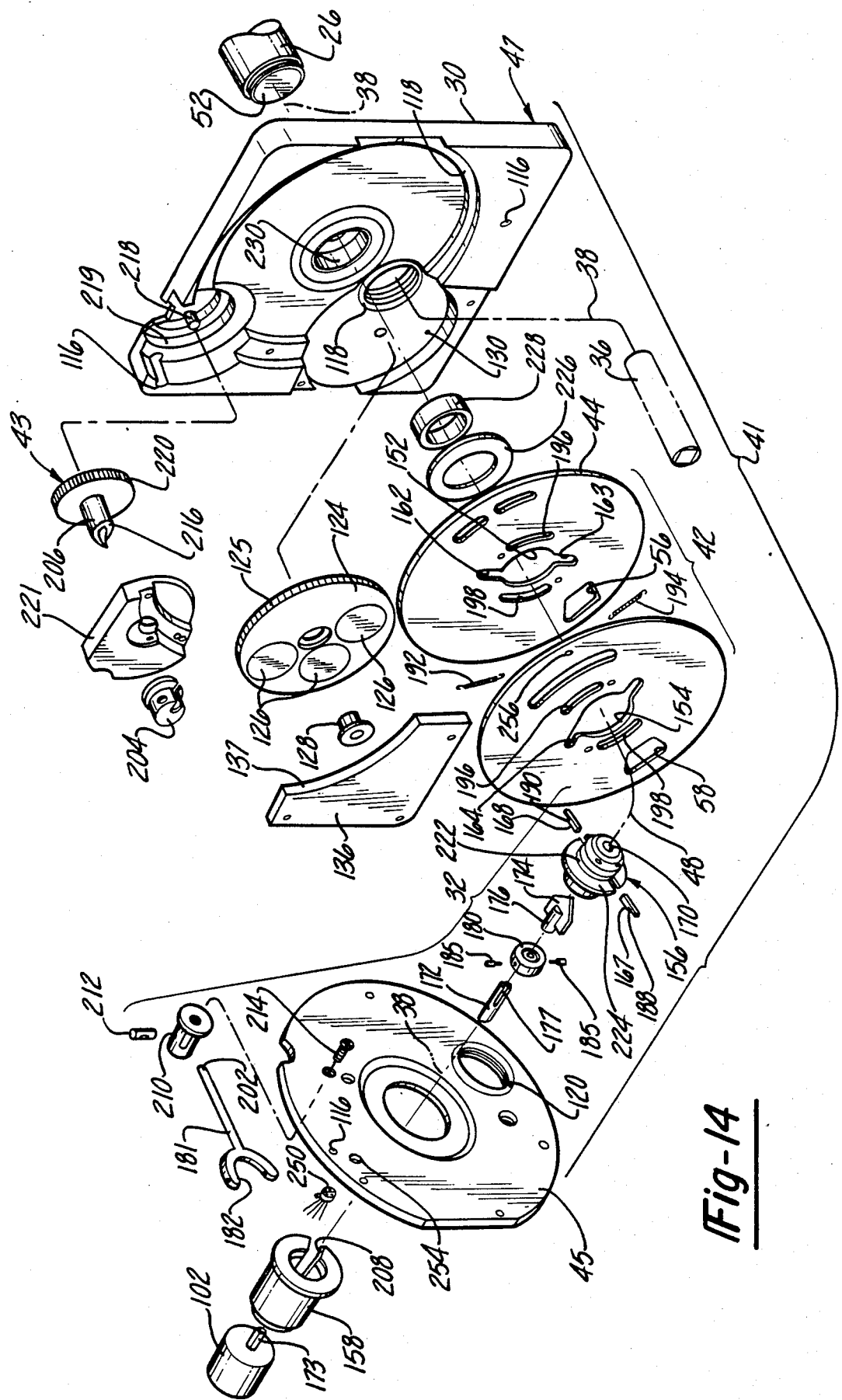

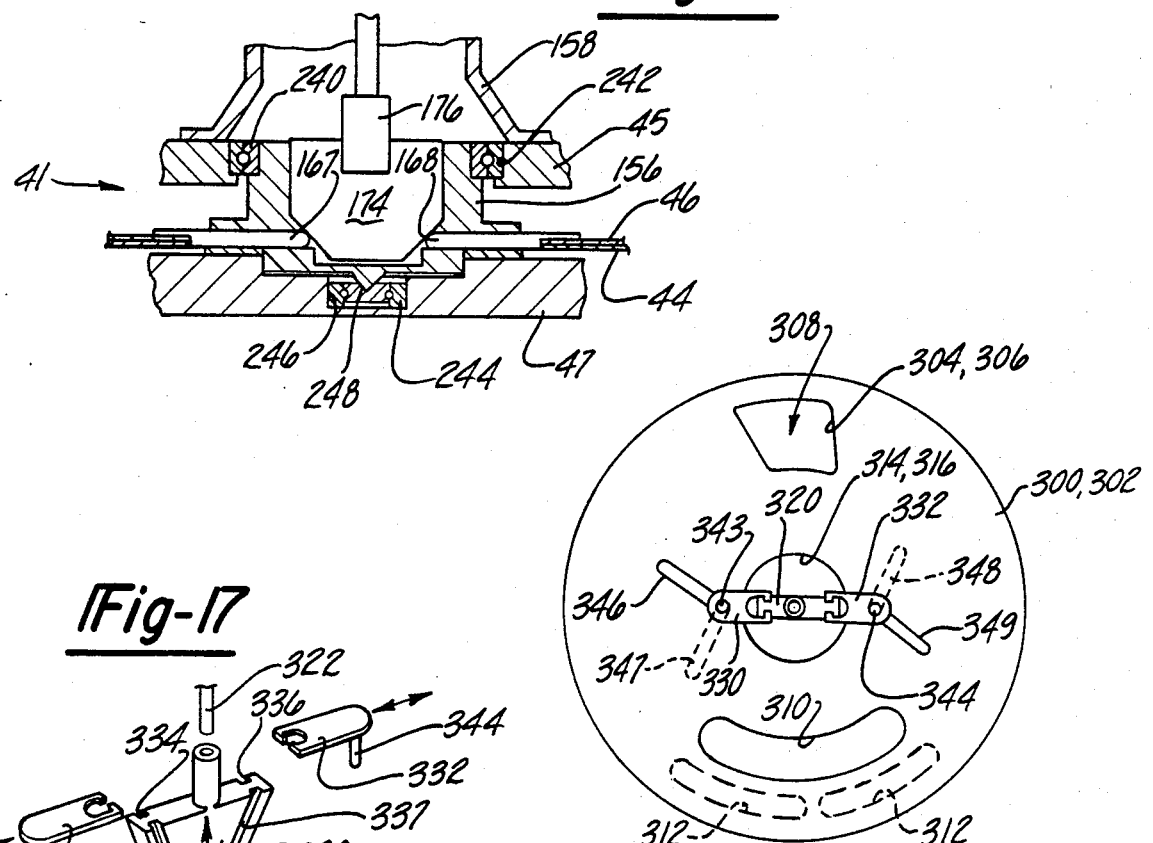
*Fig-15*
*Fig-17*
*Fig-16*
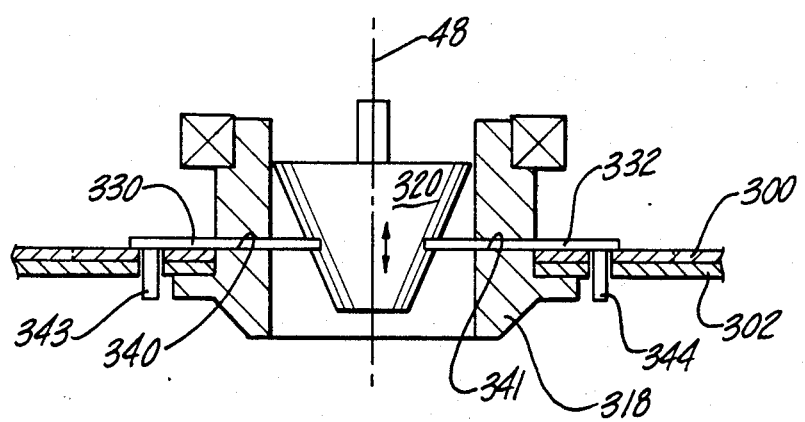
*Fig-18*

DIAGONAL SWEEP SHUTTER MECHANISM FOR VIDEO TAPE CAMERA

BACKGROUND OF THE INVENTION

1. Field of the Invention

The present invention relates generally to video cameras, and more particularly to shutter mechanisms for video cameras. More specifically, the invention relates to improved focal plane shutters for producing stop action or slow motion pictures without blurring, skewing, or distortion.

2. Description of the Prior Art

The capturing of physical images through video recording involves a process whereby light reflecting or emanating from object within a scene is collected and converted into electrical energy, and then magnetically stored for replay at a later time. The typical video system includes an optical system comprising one or more high quality, color-corrected lenses for focusing an image on the photosensitive surface of a video pickup device. Optical focusing is achieved by moving the lense with respect to the pickup device or by moving the pickup device with respect to the lense. The light which reaches the photosensitive surface of the pickup tube or other pickup device represents the image of the scene being recorded.

The exposure or quantity of light reaching the pickup tube surface may be controlled by varying the exposure time, by varying the size of the lense aperture or opening through which the exposure is made, or by varying both exposure time and lense aperture size--all of which are related to one another through the principle of reciprocity. The principle of reciprocity states generally that exposure time and lense aperture size are inversely related and that an exposure of a given quantity of light can be achieved by a wide variety of exposure time/aperture size combinations. To vary the exposure time, rotary focal plane shutters are sometimes placed between the lense and the pickup tube or device. Prior art rotary focal plane shutters are discussed more fully below. To vary the lense aperture size, it is common to provide the optical system or lense with an iris diaphragm mechanism which comprises thin overlapping metal plates that can be adjusted to form an aperture of varying size. Such mechanisms are frequently calibrated in "f-stops".

Once the optical image reaches the video pickup it is converted into an electrical video signal. The pickup is used to generate a train of electrical pulses representing the light intensities present in the optical image which is or has been focused on the surface of the pickup. Each point or pixel of this image is interrogated in its proper turn by the pickup, and an electrical impulse corresponding to the amount of light at that point is generated. Usually the electricaly impulses from a plurality of points are serially combined or concatenated to comprise the video signal. In many pickup devices popular today, each point is interrogated by an electron beam which is electrostatically or magnetically deflected back and forth across a prescribed pattern (called a raster) on the glass target found on the inside of the pickup device. Electronic deflection circuitry generates electrical waveforms which, when applied to deflection coils or the like, produce a linear scanning motion of the electron beam following the prescribed raster pattern. To improve the image it is common to generate an interlaced raster, whereby all odd numbered lines are first sequentially interrogated, followed by a vertical retrace of the beam to its point of origin, and then all even numbered lines are sequentially interrogated. During vertical retrace the electron beam is swept, usually diagonally, from its termination point at the end of the last line in the raster pattern or field to its origin point. During vertical retrace a blanking signal is generated for a duration or blanking interval sufficient to allow the beam to sweep from termination point to origin point. The blanking signal causes the pickup device to momentarily cut off its signal output so that retrace lines are not visible when the image is viewed or replayed.

Most present day video pickups comprise electron tubes although there are also solid state devices. Such electron tubes may be classified based on the method of signal generation. In a non-storage tube, the only light utilized in generating a signal is that light reaching a particular point on the tube's light sensitive region while that point is being scanned or interrogated. In a storage tube, on the other hand, an electric charge accumulates on the tube's light sensitive region at each point during the interval between successive scans for later interrogation. Because the storage type tube uses the electric charges generated by the light during the comparatively long intervals between successive scans of the image, it is more efficient and more sensitive. Storage-type tubes are further classified according to whether the light sensitive element is photoemissive or photoconductive. When photoemissive materials absorb light they emit electrons. When photoconductive materials absorb light their electrical conductivity changes.

The "vidicon" tube is one such photoconductive storage tube which has gained great popularity due to its small size and simplicity of operation. The vidicon is a storage type tube in which the signal output is developed directly from the target of the tube and is generated by a low velocity scanning beam from an electron gun. The target consists of a transparent signal electrode deposited on the face plate of the tube and a thin layer of photoconductive material, which is deposited over the electrode. The photoconductive layer serves two purposes. It is the light sensitive element, and it also forms the storage surface for the electrical charge pattern that corresponds to the light image falling on the signal electrode. The photoconductive material has a fairly high resistance when in the dark. Light falling on the material excites additional electrons into a conducting state, lowering the resistance of the photoconductive material at the point of illumination. In operation, a positive voltage is applied to one side of the photoconductive layer via the signal electrode. On the other side of the layer the scanning electron beam deposits low velocity electrons in sufficient numbers to maintain a net zero voltage. In the interval between successive scans of a particular spot, the incident light lowers the resistance in relation to its intensity. With the resistance lowered, current flows through the surface of the photoconductive layer and a positive charge is built up on the back surface of the layer; that positive charge is then held until the beam returns to scan the point. When the beam returns, a signal output current is generated at the signal electrode as this positively charged area returns to zero voltage.

In order to provide low velocity electrons in a uniform manner, a fine mesh screen is stretched across the interior of the tube near the target. The screen is energized to cause the electron scanning beam to decelerate uniformly at all points and to approach the target in a perpendicular manner. The beam is brought into sharp focus on the target by longitudinal magnetic fields produced by focusing coils surrounding the tube. The beam is made to scan the target in its characteristic raster pattern by varying magnetic fields produced by horizontal and vertical deflection coils also disposed about the tube.

Video systems of the prior art, including those using storage tube devices, have been historically plagued with difficult and troublesome blurring, skewing and distortion when used to produce slow motion or stop-action images. Slow motion and stop action images are created during playback by utilizing specially equipped video tape decks. Such tape decks, however, can only produce images as clear and sharp as the video camera which produced them. If the video camera produces blurred, fuzzy or distorted images, then the taped image will also be blurred, fuzzy and distorted. These undesirable effects are most apparent during slow motion or stop-action replay.

A prior art solution to the problem of blurred images is to interpose a rotary shutter between the lense and pickup of an otherwise standard video camera. The rotary shutter of the prior art comprises a circular disk provided with at least one matched pair of apertures spaced 180° apart about the circumference. The disk is rotated at a constant speed in use (typically 1800 rpm). The apertures are positioned about a locus between lenses and pickup so that for two brief intervals per disk revolution, light images will illuminate the pickup tube. The apertures are pie-shaped openings or segments bounded by radial lines emanating from the center of rotation of the disk. Thus, by virtue of the fact that the pie-shaped apertures are paired and spaced 180° apart, 3,600 individual or discrete exposures are made each minute at a rotational rate of 1800 rpm. The exposures are timed to occur during the blanking intervals, hence each full raster interrogation produces a train of electrical impulses which represents the image exposed during a previous blanking interval. By using very short time intervals a fast moving object, such as a rocket sled, or an athletic event, can be captured, stored and reproduced with less blurring or fuzziness than without the shutter. However, shutters of the prior art have been heretofore limited to shutter speeds fo no faster than 1/10,000 second. While this might seem quite fast, in high speed motion studies, during athletic events, and so forth, there are numerous events which cannot be captured satisfactorily at this shutter speed.

Moreover, there has heretofore been an unsolved problem associated with fast shutter speeds. Too fast a shutter speed can effectively reduce the overall quantity of light reaching the pickup to the point where the pickup cannot properly respond. One solution is to open the lense aperture, if one is provided, to a wider f-stop-which has its own drawbacks, among them being a degredation in depth of field. Another solution is to provide other, slower shutter speeds. Thus, prior art shutters are frequently provided with a plurality of different sized matched pairs of pie-shaped apertures, each pair corresponding to a different discrete exposure time or shutter speed. With such an arrangement, however, it is not possible to continuously vary the shutter speed. One cannot, for example, select a shutter speed between two discrete speeds. Furthermore, in order to change shutter speeds using prior art systems, it is necessary to first stop the rotating shutter mechanism and lock it in place while indexing the mechanism to a new shutter speed. Varying the shutter speed while the shutter is in motion (while recording a scene, for example) is not possible with prior art systems. Hence, such systems cannot be made to readily react to transient changes in light levels, such as might be caused by a passing cloud.

Another problem with prior art rotary shutter devices stems from the use of a pie-shaped shutter opening. Video pickup tubes usually have a rectangular format, e.g. 4:3 width-to-height ratio. To evenly illuminate a rectangular pickup surface the shutter aperture must be constructed to sweep across equal areas at equal rates on both sides of the diagonal of the rectangular surface. In other words, the rectangular pickup must be oriented so that one of its vertical or horizontal centerlines coincides with the radial lines which bound the pie-shaped shutter aperture. Although there are an infinite number of locations for the rectangular pickup about 360° arc, only four of these locations (located 90° apart) result in a horizontally or vertically disposed picture tube format that can be swept evenly by a pie-shaped opening. All other orientations result in a pickup surface which is skewed unnaturally to the opening. The undesirability of having a skewed format is evident when one recognizes that the camera (or viewing screen) would always have to be held or shimmed at an angel in order to render horizontal surfaces horizontal and vertical surfaces vertical.

By constraining the location of the pickup tube relative to the shutter mechanism, the overall physical design of the camera (i.e., the size, shape, and bulkiness) is appreciably affected. Such restraints, as a practical matter, result in a larger, bulkier, less aesthetically pleasing and more cumbersome to operate camera than would otherwise result were the camera designer free to place components neatly and compactly in aesthetically pleasing packages with all controls conveniently located at the fingertips.

SUMMARY OF THE INVENTION

Accordingly, in order to improve upon prior art shutter mechanisms for video cameras, the present invention provides a shutter mechanism which is capable of operating at vastly increased shutter speeds for sharper, clearer images and for less skewing and distortion. Fast moving objects may be studied in slow motion or stop-action with greater clarity. Shutter speeds may be varied over a continuous range, as opposed to in discrete steps, and the shutter speed may be varied over this continuous range while the shutter is operating. Hence, with the present invention, it is no longer necessary to stop the shutter while indexing to a new shutter speed. This enables the video camera to automatically respond to momentary changes in lighting, resulting in a proper exposure at all times. In addition, the invention permits the video pickup device to be placed anywhere in a 360° arc about the rotational axis of the shutter. Hence, design constraints inherent to prior art video cameras are eliminated.

In accordance with the invention, a focal plane shutter for a video camera is provided comprising a disk mechanism positioned between the lense and pickup tube or device of the video camera for rotation about an axis. The video pickup device will be understood to include multiple devices, such as three tube or three device cameras, and other multiple (6, 12, 14, etc.)

pickup systems. "Chip" cameras using a plurality (e.g. 75,000-300,000) of individual sensors, as well as memory chip and computer enhanced cameras are also contemplated as within the scope of the invention. Rotation of the disk mechanism about the axis defines an annular locus which is in registration with the pickup and lense. The disk mechanism is provided with a single light-admitting aperture intersecting or lying within the locus, whereby the disk mechanism, except for the aperture, is opaque to the passage of light between the lense and the pickup. The invention also comprises a means for rotating the disk mechanism. The disk mechanism is disposed in a certain relation relative to the pickup in order to block light from reaching the pickup at all times, except during a single, uninterrupted interval occurring not more than once each revolution of the disk mechanism and lasting for less than the period of revolution.

The invention further comprises a focal plane shutter in which the disk mechanism is made up of a first disk disposed between the lense and pickup for rotation about an axis and a second disk disposed between the lense and pickup for rotation about the same axis. Rotation about the axis defines an annular locus in registration with the pickup and lense. Both first and second disks are provided with an opening in registration with or intersecting the annular locus. These openings are registrable by properly adjusting the angular position of one disk in relation to the other disk to define a light admitting aperture between the lense and the pickup. A means is provided for rotating the first and second disks at a common speed. In addition, means are provided for adjusting the relative angular positions of the disks relative to one another to thereby adjust the size of the light admitting aperture.

Further, the invention also provides a focal plane shutter for a video camera having a disk disposed between lense and pickup for rotation about an axis, the disk having a light admitting opening bounded on first and second sides by lines emanating from a point on the disk offset from the axis of rotation. Preferably, the offset distance is determined in accordance with the diagonal dimension of the video pickup surface.

These and other objects and advantages of the present invention will become more apparent from the following description and with reference to the accompanying drawings.

BRIEF DESCRIPTION OF THE DRAWINGS

FIG. 1 is a perspective view of a video camera which employs the shutter mechanism of the present invention;

FIG. 2 is an exploded diagrammatic view illustrating the shutter mechanism of the present invention in conjunction with a lense system and video pickup;

FIG. 2a is a fragmentary view of the shutter mechanism of FIG. 2;

FIG. 3 is a schematic view of an exemplary video pickup tube in use with the present invention;

FIG. 4 is a diagrammatic illustration of a raster scan pattern useful in understanding the operation of the invention;

FIG. 5 is a diagrammatic illustration of the rectangular raster area on a video pickup face plate, showing the swept illumination thereof as the shutter mechanism rotates;

FIG. 6 is a plan view of an alternate shutter disk configuration;

FIG. 14 is an exploded perspective view of the primary components of the shutter mechanism of FIGS. 11-13;

FIG. 15 is a fragmentary view of the shutter mechanism illustrating another embodiment;

FIGS. 16-18 illustrate another embodiment of the invention, particularly an alternate mechanism for adjusting the shutter disks;

DESCRIPTION OF THE PREFERRED EMBODIMENTS

Figure 7:
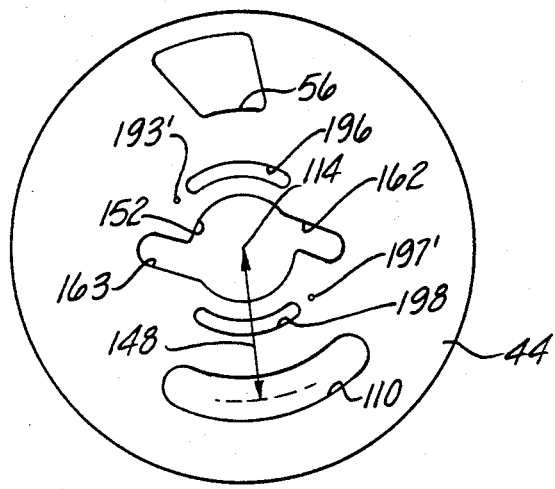
FIG. 7 is a plan view of a first shutter disk in accordance with the invention.

Referring first to FIG. 1, a video camera in accordance with the present invention is illustrated at 20. The camera includes case or housing 22, AC/DC adapter 23, electronic viewfinder 24, viewfinder attachment boom 25 and lense 26. The lense 26 is mounted to the front cover 30 of the shutter member 41. The lense 26 has a C-type mount and automatic focus and automatic zoom features operated by a servo motor mechanism 27. Power for operation of the servo mechanism is achieved through cord or wire 28 which is connected to the camera by plug 29. The electronic viewfinder 24, which is adapted to be mounted optionally on the back of the camera 20, is connected to the camera by cord or wire 31. The AC/DC adapter 23 converts the incoming AC power source to DC power for use in operating the various mechanisms of the camera. A bracket or "shoe" 33 is positioned on the top of the camera 20 for mounting of various accessories, if desired, such as an additional light source. A microphone 35 is provided to pick up the audio signals from the subject being video taped. A mounting plate (not shown) or shoulder brace (also not shown) are also provided on the bottom of the camera 20 for use in mounting or using the camera.

The shutter member 41 has an adjust knob 43 (or "thumb wheel") which protrudes through the edge of the front cover 30 and is used by the operator to adjust the shutter speed. The adjustment mechanism 32 which is connected to the knob 43 and which actually adjusts the shutter speed is discussed in detail below. Also, as discussed below, the adjustment mechanism 32 is all located rearward of the front cover 30 which leaves the front cover flat and with ample room for manual or automatic zoom lens mechanisms. Since the lenses typically use C-type mounts which screw onto the camera, an adapter which would change the focal quality of the camera would be required if the front cover 30 was not flat.

In the present preferred embodiment of the invention, the camera 20 has a Sony chassis which has been modified to make it wider and longer. The Sony chassis has a ⅝" SMF Trinicon pickup tube.

FIG. 2 illustrates a few important components of the video camera 20, with exterior housing 22 and most internal components eliminated. A video pickup device 36, such as a video pickup tube, is disposed in line with lense 26 as along the common axis 38 between lense 26 and video pickup 36. Video pickup 36 may be implemented using any of a wide variety of video pickup devices including vidicon tubes, saticon tubes, newvicon tubes, plumbicon tubes, chalnicon tubes, and the like. Also, solid state pickup devices, including optically sensitive random access memory devices (RAM), may be used. The invention is also equally applicable to systems using multiple pickup devices, such as a three pickup tube system for color video recording. Hence the term "video pickup device 36" will be understood to include such multiple pickup devices.

Video pickup device 36 has a faceplate 40 onto which the optical image is projected. The video pickup device 36 converts this optical image into a continuous stream of electrical impulses representing the image, and this stream of impulses may be magnetically encoded for storage on a magnetic video tape. While the images are being recorded, the stream of video information may also be fed to electronic view finder 24 or to a video monitor for an immediate review of the program material as it is being recorded.

Also shown in FIG. 2 is the disk shaped rotary focal plane shutter mechanism 42 which is one of the principal components of the shutter member 41. In the preferred embodiment, shutter mechanism 42 comprises a first disk member 44 which is positioned adjacent lense 26, and a second disk member 46 which is positioned adjacent pickup 36. Shutter mechanism 42, including first disk 44 and second disk 46, is positioned between lense 26 and pickup 36 and supported for rotation about a central axis 48. As shutter mechanism 42 rotates about axis 48 an annular locus 50 is defined by and remains in registration with faceplate 40 of video pickup 36. The same locus 50 is also in registration with the mounting end 52 of lense 26. Generally speaking, locus 50 may be considered as the annular portion of shutter mechanism 42 which is illuminated by light emanating from end 52 of lense 26 or which lies directly adjacent faceplate 40.

Shutter mechanism 42 is provided with a light admitting aperture 54 which lies generally within or intersects locus 50 to permit light emanating from end 52 of lense 26 to reach faceplate 40 of video pickup 36. Except for aperture 54, the remainder of shutter mechanism 42 is opaque to the passage of light.

In a presently preferred embodiment, the light admitting aperture 54 is comprised of a pair of openings in registration with one another as shown in FIG. 2a. First disk 44 is provided with opening 56 and second disk 46 is provided with opening 58. Disks 44 and 46 may be rotated about central axis 48 until openings 56 and 58 intersect or overlap to define the light admitting aperture 54. By altering the angular positions of the disks 44 and 46 relative to one another, the size of light admitting aperture 54 can be continuously varied from a thin slit (shown in FIG. 10), through intermediate sized apertures, to a full sized aperture (shown in FIG. 9) which results when openings 56 and 58 are in perfect coincident registration. Preferably openings 56 and 58 are the same size and shape.

With reference to FIG. 3, video pickup 36 is shown schematically. For purposes of illustrating the invention, video pickup 36 is shown as a vidicon tube, however, it will be appreciated that the invention is equally applicable to video camera systems using other types of video pickup devices, including solid state devices. Hence, the invention is not intended to be limited to any particular type of video pickup. The video pickup device illustrated in FIG. 3 is denoted generally by reference numeral 36, and includes a cylindrical glass tube 60 on which glass faceplate 40 is secured or integrally formed. Pickup 36 has a target section 62 comprising a transparent signal electrode 64 deposited on the inside of faceplate 40 and a thin layer of photoconductive material 66 which is deposited over electrode 64. The photoconductive material has a fairly high resistance when in the dark. Light falling on the material excites additional electrons into a conducting state, lowering the resistance of the material at the point of illumination. Video pickup 36 also includes an electron gun 68 which may be energized to produce an electron beam. Horizontal and vertical deflecting coils 70 deflect the electron beam in accordance with horizontal and vertical deflection circuitry 72 to produce a raster scanning pattern on the target section 62. A fine mesh screen 74 stretched across tube 60 near target section 62 causes the electron scanning beam to decelerate uniformly at all points and approach the target in a perpendicular manner. The beam is brought to a sharp focus on target section 62 by means of longitudinal magnetic fields produced by a focusing coil 76 which is energized at the proper focusing voltage by voltage source 78. The video signal output is coupled via output lead 80 to signal amplifying and processing circuitry 82. The signal output on output lead 80 constitutes a video signal.

In operation, a positive voltage is applied to one side of the photoconductive layer 66 by means of the signal electrode 64. On the other side of the photoconductive layer 66 the electron scanning beam deposits low velocity electrons in accordance with a predetermined raster scan pattern. A typical raster scan pattern is illustrated in FIG. 4 as it would be viewed from outside faceplate 40. As shown in FIG. 4, the raster pattern 84 is generally rectangular, having horizontal dimension 86, vertical dimension 88 and a pair of diagonals 90 and 92 which intersect at the raster center point 94. Raster pattern 84 is produced by successive horizontal sweeps of the electron beam or lines. By convention, these lines are numbered consecutively beginning with line No. 1 at the bottom of raster pattern 84. Scanning starts at the bottom since the image is inverted by the lense. The number of lines may vary depending upon the resolution of a particular video system. A typical system might have 525 lines, for example. To minimize flickering, the raster pattern is frequently generated by interlacing the odd and even fields. This is accomplished by first scanning all odd numbered lines (referred to as the odd field), and by then scanning all even numbered lines (the even field). By convention, both the odd and even fields commence in the lower right hand corner or origin point 96 and end in the upper left hand corner or termination point 98. Each field is generated by sweeping back and forth; for example, Line 1 is swept from right to left, Line 3 from left to right, Line 5 from right to left, etc. When the scanning beam reaches the termination point 98 it is swept diagonally generally along diagonal line 92, to the origin point 96. This diagonal sweep is called the vertical retrace. During the time in which vertical retrace occurs, the video signal is blanked by means of blanking circuitry 100 (FIG. 3) so that the diagonal retrace line is not visible.

As previously discussed, in the interval between successive scans of a particular spot on target section 62, any incident light illuminating that spot lowers the resistance of the photoconductive layer at that spot in relation to the light's intensity. Current then flows through layer 66 causing the back surface thereof to build up a positive charge until the beam returns to scan the spot. A video output current pulse is generated at that spot on signal electrode 64 when the beam restores the positively charged spot to a zero voltage. As the beam continues to scan, these current pulses are continually emitted to make up the video signal.

With continued reference to FIG. 3, disks 44 and 46 are axially rotated by motor 102 which is attached to the back cover plate 45 of shutter member 41 and protrudes into the housing 22. In the presently preferred embodiment, motor 102 drives disks 44 and 46 at nominally 3600 rpm. Rotation is clockwise as viewed from the motor side, or counter clockwise as viewed from the lense side. Both the disks are oriented so that openings 56 and 58 are in partial or full registration to define the light admitting aperture 54 through which light from lense 26 is projected onto faceplate 40. Motor 102 rotates disks 44 and 46 so that an image will be projected on faceplate 40 once in each revolution. At a rotation of 3600 rpm, 60 separate exposures per second are projected on faceplate 40. These exposures are timed to occur during the blanking interval when the scanning beam is executing a vertical retrace. During the remainder of time, faceplate 40 receives no light through the opaque disks. Hence, the scanning beam always interrogates an unchanging visual image stored in the photoconductive layer 66 during a vertical retrace. Because the image is unchanging (no new light is admitted to change the image), the resultant video signal on lead 80 represents a sharp, unblurred video image. Since 60 such individual exposures are made each second, no perceptible flicker is evident when the video signals are viewed on a video monitor.

With reference to FIG. 5, it will be seen that the rotation of disks 44 and 46, which cooperate to form shutter mechanism 42, causes faceplate 40 to be swept with light once per revolution. As indicated above, it is presently preferred to illuminate faceplate 40 during the vertical retrace interval of the raster scan cycle. The vertical retrace occurs at repeated intervals determined by the electron beam scanning rate and the number of lines which make up the raster. Thus, in many practical applications the illumination of faceplate 40 occurs at intervals corresponding to the periods between vertical retrace cycles which are electronically predetermined. By employing a single light admitting aperture 54 the present invention enjoys the highest possible shutter speed or sweep rate for any given retrace period. To demonstrate this, FIG. 5 may be compared with FIG. 6 which illustrates an alternative shutter member 104 having two light admitting apertures 106 and 108 equally spaced about annular locus 50. Using the shutter mechanism of FIG. 6, the speed of rotation must be half that of shutter mechanism 42 in FIG. 5 in order to illuminate faceplate 40 at the same time intervals. As indicated, these time intervals are often dictated by and occur in synchronism with the vertical retrace cycle. Hence, the shutter speed, or the speed at which light is swept across faceplate 40, of the two-aperture embodiment of FIG. 6 is one-half that of the single-aperture embodiment of FIG. 5. A practical effect is that the single-aperture embodiment illuminates faceplate 40 for half as long as the two aperture embodiment for each illumination interval. The single-aperture embodiment is thus capable of capturing sharp images of fast moving objects which appear as a blur through the two-aperture embodiment.

Figure 8:
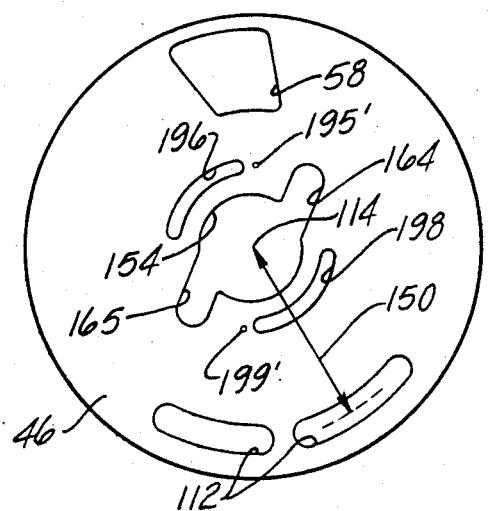
FIG. 8 is a plan view of a second shutter disk in accordance with the invention.
Figure 9:
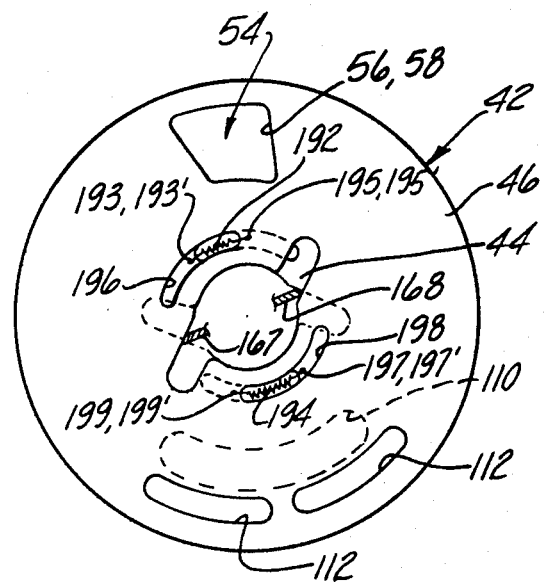
FIG. 9 is a perspective view of the disks of FIGS. 7 and 8, in relative angular position to one another to create a large light admitting aperture.
Figure 10:
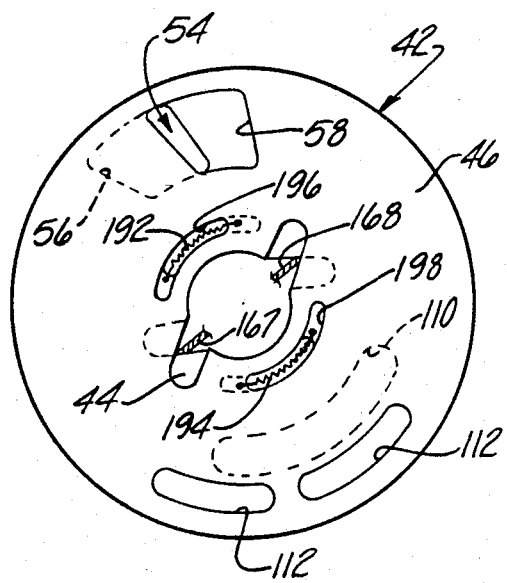
FIG. 10 is a similar perspective view showing the disks of FIGS. 7 and 8 in a different relative angular position to create a relatively narrow light admitting aperture.

Preferably disks 44 and 46 are thin circular disks of aluminum or titanium which are supported for rotation about their respective geometric centers. In order to place the inertial centers of the disks at their geometric centers, the disks are provided with counterbalancing cutout regions. These counterbalancing cutouts cause each disk's center of mass to coincide with its geometric center. Hence, when the disks are spun, the polar moment of inertia is zero or substantially zero. FIG. 7 illustrates disk 44 which is provided with cutout region 110; and FIG. 8 illustrates disk 46 which is provided with cutout regions 112. Cutout region 110 on disk 44 is disposed at an average distance 148 from the geometric center 114 that is different from the average distance 150 at which cutout regions 112 are disposed on disk 46. Thus, when disks 44 and 46 are spun about central axis 48 through their common geometric centers 114, cutouts 110 and 112 nowhere overlap. Thus, shutter mechanism 42, comprising disks 44 and 46 remain opaque to the passage of light (except at the aperture 54), notwithstanding the fact that both individual disks 44 and 46 are provided with cutouts. FIGS. 9 and 10 illustrate disks 44 and 46 in overlapping disposition exemplary of two possible aperture sizes. In both Figures, note that cutouts 110 and 112 nowhere overlap. Further in this regard, since both disks 44 and 46 are rotated as a common unit or in phase with one another, the cutouts 110 and 112 do not in normal operation overlap with openings 56 and 58.

Unlike the situation with prior art focal plane shutters, the focal plane shutter of the present invention permits the operator to continuously vary the shutter speed while the shutter is in motion. Although the shutter mechanism 42 rotates at a constant speed in synchronism with the raster scan pattern, the relative size of aperture 54 may be continuously varied by a number of different mechanisms to alter the shutter speed. In this regard, the shutter speed will be understood as a measure of the length of time during which the image is projected on a given point on faceplate 40 during a given revolution of shutter mechanism 42. In general, the larger the relative size of aperture 54, the longer an image is projected on faceplate 40, and hence the slower the shutter speed. Hence, FIG. 9 depicts the largest size aperture 54 corresponding to the slowest shutter speed; while FIG. 10 depicts a relatively narrow or small aperture 54 corresponding to one of the fastest shutter speeds. In practice, utilizing disks 44 and 46 having the size and shape shown in FIGS. 7 and 8, at a rotational speed of 3600 rpm, the invention will provide continuously variable shutter speeds from nominally 1/500 to 1/20,000 second. The 1/20,000 second speed is achieved with an opening subtending a 1° arc.

A number of mechanisms may be alternatively used to change the relative angular position of one disk with respect to the other and to thereby change the effective size of aperture 54. These mechanisms include mechanical linkages as well as hydraulic actuators. Alternatively, disks 44 and 46 might also be rotated using separate phase-locked motors wherein at least one of the motors is driven by a source capable of introducing a phase lag or lead to thereby alter the relative angular position of the disks to one another.

A preferred mechanism for mounting and operating the shutter mechanism 42 is illustrated in FIGS. 11-14. The shutter member 41 comprises a thin, relatively square shaped housing 47 which is adapted to be mounted by screws or bolts through openings 116 to the front of the case or housing 22 of the video camera 20. The housing 47 is made of aluminum or another material which has similar strength and weight characteristics, and which can be machined and formed in the shape and configurations shown. The interior of the housing has one or more bores or recesses in it, as described below, and the hollow interior is covered by back cover 45. The back cover 45 is neatly positioned in recess 115 in the housing and held in place by a series of small screws 117.

Figure 12:
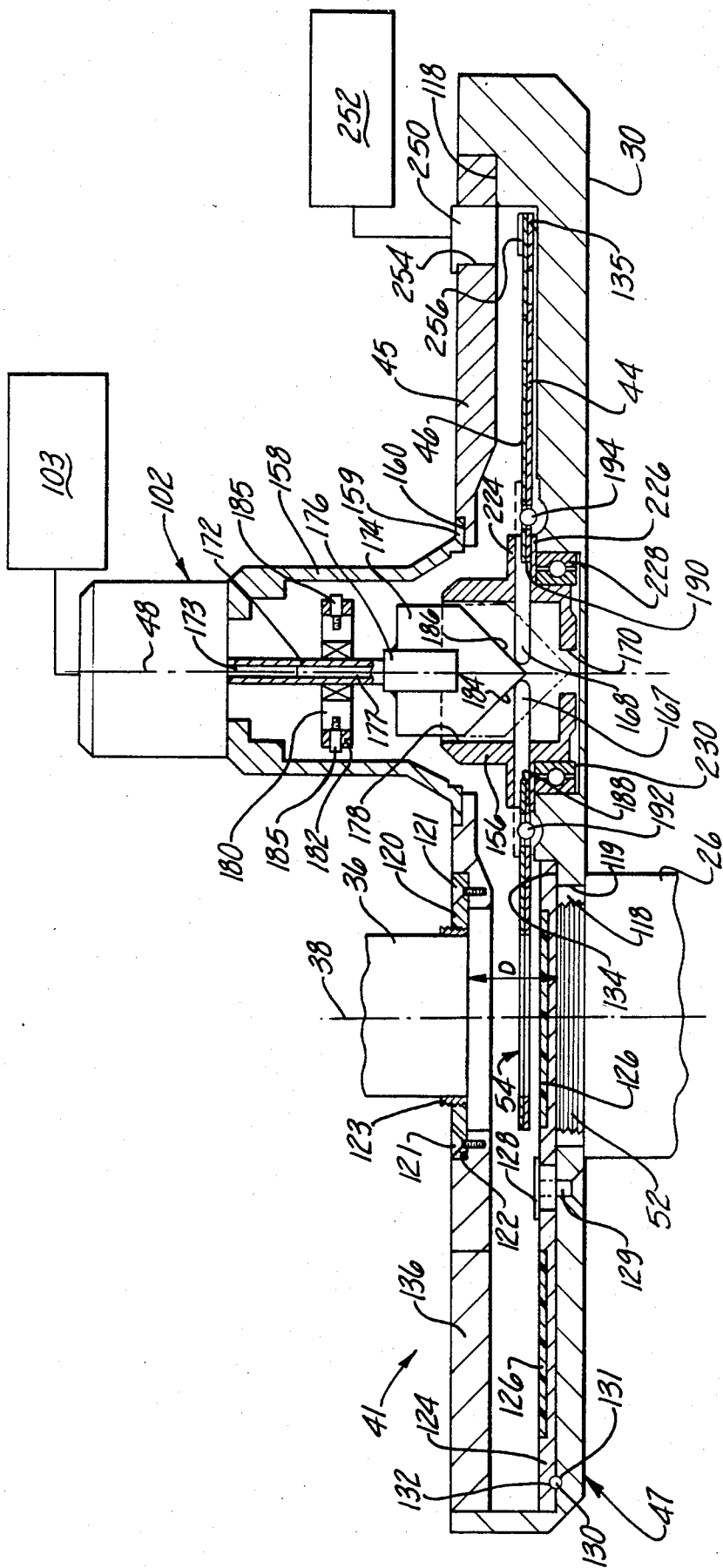
FIG. 12 is a cross sectional view of the shutter mechanism shown in FIG. 11, taken along line 12—12 of FIG. 11.

The lense 26 is mounted on the front 30 of the housing 47. A stainless steel threaded lens ring 118 is pressfit in opening or bore 119 in the housing and the end 52 of the lense 26 is threaded securely into it. The video pickup 36 is positioned adjacent the back cover 45 of the hosuing on the same axis 38 as the lense. Typically, the video pickup is adjustable axiallly in the camera 20 for focusing. The distance D between the faceplate 40 of the video pickup 36 and the end 52 of the lense 26 is between 0.400 and 0.500 inches and has to be maintained in this range for proper focusing and operation of the camera without additional adaptors and the like. If desired, the video pickup 36 can be attached to the housing 47 as shown in FIG. 12. A threaded annular-shaped ring 120 is secured, for example by screws 121, into recess 122 in the back cover 45 and mates with threaded ring 123 on the video pickup 36. In this manner, the video pickup can be axially adjusted precisely and accurately.

Figure 11:
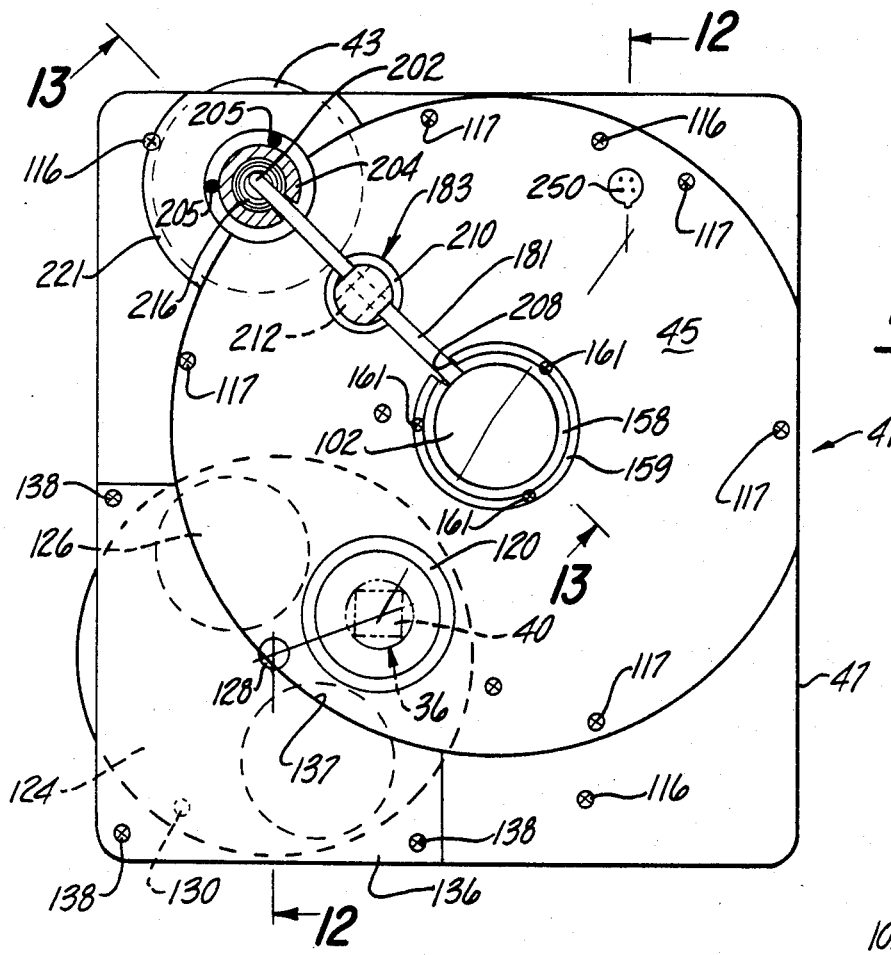
FIG. 11 is a rear elevation view showing a preferred shutter rotating and adjusting mechanism in accordance with the invention.

A filter wheel 124 is interposed between the lense 26 and video pickup 36. The wheel 124 has three filters 126 of various colors commonly used in videotaping. The wheel 124 rotates on bushing 128 which is secured to the housing 47 by screw 129. A portion of the wheel 124 protrudes outside the housing 47 (as shown in FIG. 11) so that it can be manually rotated. For this purpose, the outside perimeter 125 of the wheel 124 is knurled or ribbed. When the wheel 124 is rotated, one of the filters 126 becomes aligned axially with the lense 26, video pickup 36 and light admitting aperature 54 in the shutter disks 44 and 46. In this manner the light entering the video pickup from the lense is filtered as desired. An indexing ball bearing 130 is set in a recess 131 in the housing 47 and mates with one of four shallow recesses 132 in the filter wheel 124. The ball bearing and mating recesses act to index the filter wheel to one of four positions, three of which interpose a filter 126 in the camera light path and the fourth of which prohibits any light from entering the camera. The latter position of the filter wheel is used to protect the expensive video pickup 36 during storage and handling of the camera, or when the camera might be exposed to undesirable bright light.

As shown in FIG. 12, the filter wheel 124 is contained in a recess 134 in the interior of the housing 47 and is also positioned between the disks 44, 46 and the lense 26. It is also possible to arrange the parts so that the filter wheel is positioned between the disks 44, 46 and the video pickup 36. In either situation, the filter wheel will perform the same function and be manually operated from outside the housing. The final positioning of the filter wheel is determined by the dimension D and by whether a mechanism is needed, such as ring 120, to hold and/or adjust the end of the video pickup 36.

A separate cover 136 is utilized to cover the filter wheel in the housing 47. One edge 137 of the cover 136 is curved to match and mate with the edge of the circular back cover 45. Several screws 138 hold the cover 136 to the housing 47.

Disks 44 and 46 are provided with central openings 152 and 154, respectively, for mounting on a hub member 156. Hub member 156 is disposed within or slightly below motor support housing 158 which in turn is secured to back cover 45 of housing 47. The support housing has a flange 159 which is positioned in mating recess 160 in cover 45. The housing 158 is secured to the cover 45 by a number of screws 161. Motor 102 is fastened to motor support housing 158 and is coupled to hub member 156 for imparting rotary motion thereto. Disks 44 and 46 are fastened to hub 156 and rotate therewith. Central openings 152 and 154 are each provided with a pair of tangentially extending slotted openings 162-165. More specifically, central opening 152 is provided with a first slotted opening 162 extending tangentially or spirally outwardly from geometric center 114, and a second slotted opening 163 extending tangentially or spirally in a diametrically opposite direction to slotted opening 162. Similarly, central opening 154 is provided with a first slotted opening 164 and a second diametrically opposing slotted opening 165. (For ease of reference, see FIGS. 7 and 8, as well as FIG. 14.) When disks 44 and 46 are positioned in registration with one another on hub 156, the slotted openings 162-165 cross one another to define a pair of V-shaped or X-shaped configurations as shown in FIGS. 9 and 10. As explained more fully below, the precise configurations defined by the slotted openings determines the degree to which openings 56 and 58 overlap, thereby defining the size of light admitting aperture 54.

In order to change the configuration of the slotted openings 162 through 165, pins 167 and 168 are slideably secured within hub 156 for radial movement inwardly and outwardly with respect to hub axis 48. Hub 156 is provided with a central opening 170. Hub member 156 is further provided with an axial slot 175 for slideably receiving an arrowhead-shaped blade accuator 174 disposed on shaft 172. Shaft 172 is pressfitted or otherwise securely fastened at one end to drive shaft 173 of motor 102. Shaft 172 is fastened at its other end to the blade accuator 174 by being slip fitted inside cylindrical housing 176 which is secured to the blade.

Shaft 172 has a slotted end 177 which slips over the blade. The accuator blade 174 is inserted into slot 175 and rests against the pins 167 and 168.

Throw-out bearing mechanism 180 is securely fastened over shaft 172 and is coupled to a rocker arm or lever 181. Lever 181 is supported at fulcrum point 183 for rocking movement which causes the arrowhead-shaped blade accuator 174 to be translated along axis 48. Lever 181 has a yoke 182 and is pivotably attached to bearing 180 by pins 185.

The inner ends of pins 167 and 168 bear against edges 184 and 186 of blade 174 and radially translate inwardly and outwardly to follow edges 184 and 186 as the accuator blade is moved axially in slot 175. The outer ends of pins 167 and 168 bear against disks 44 and 46 at shoulders 188 and 190. Specifically, shoulders 188 and 190 bear against portions of disks 44 and 46 which define the perimeters of slotted openings 162-164 (as best shown in FIGS. 9 and 10). Thus, radial movement of pins 167 and 168 is translated into rotational movement of disks 44 and 46 in opposite directions to one another.

A pair of springs 192 and 194, disposed in arcuate-shaped slots 196 and 198 in disks 44 and 46, bias disks 44 and 46 to rotate in directions opposing the outward movement of the pins 167 and 168. (For ease of reference the spring slots in disks 44 and 46 have both been marked with the same reference numbers 196 and 198; curved slots 196 and 198 are identical in both disks.) The relationship of the springs to the disks is best shown in FIGS. 9, 10, 12 and 14. One end of each spring 192, 194 is hooked in a hole in one disk 44, 46 and the other end of each spring is hooked in a hole in the other disk. For example, spring 192 has one end 193 fastened in hole 193' in disk 44 and the other end 195 fastened in hole 195' in disk 46. Similarly, spring 194 has one end 197 fastened in hole 197' in disk 44 and the other end 199 fastened in hole 199' in disk 46.

When the springs 192 and 194 are at "rest" (in their untensioned position), the openings 56 and 58 completely overlap (FIG. 9). At this position, the blade accuator 174 applies no force on pins 167 and 168. When the shutter speed is increased (i.e., the light admitting aperature is made smaller) and the blade 174 pushed axially downwardly into hub 156, the pins 167 and 168 are pushed outwardly into the "Vs" between the central openings of the disks. At this position (as illustrated in FIG. 10), the springs 192 and 194 are extended and the force caused by the pins 167 and 168 overcomes the force of the springs. Later, when the shutter speed is decreased and the aperature 54 is enlarged, the accuator blade 174 is retracted and the force of the springs 192, 194 pushes the pins radially inwardly and tries to restore the discs to their "rest" position.

The axial movement of the arrowhead-shaped blade 174 and thus the resultant opening and closing of the light admitting aperature 54 is effectuated by movement of the lever 181. As indicated above, the lever 181 is pivoted at fulcrum point 183 and one end is connected with a yoke 182 to thrust bearing 180 and directly moves the blade accuator 174. The other or distal end 202 of the lever 181 is fitted into a slotted cap 204 containing a nylon mover 206 rotatably secured therein. The cap 204 is secured to back cover 45 with screws 205.

The lever 181 protrudes through a slot 208 in the motor support housing 158 and passes directly through a cap housing 210. The lever arm is positioned in a rotatably mounted bushing 212 in the cap housing 210. The cap housing 210 is secured to the back cover 45 by screw 214.

Mover 206 has a beveled or angled surface 216 upon which distal end 202 rides. Mover 206 is fastened to and a part of adjustment knob 43 which was previously described. The knob 43 rotates on a peg 218 in recess 219 of housing 47 and has a knurled or ribbed edge 220 for manual rotation. Cover member 221 is positioned over the mover and adjustment knob and holds the knob in place on peg 218. The cover member 221 also acts as the seat for slotted cap 204.

Adjustment of the shutter aperature 54 is controlled by the camera operator by manual rotation of the knob 43. As indicated earlier, the adjustment of the shutter aperature can be carried out while the disks 44, 46 are rotating; the relative angular positions of the disks can be adjusted while they are rotating in a common direction about their axis of rotation. It is also possible for the shutter aperture to be adjusted automatically, for example by means of a motorized system or linkage which is activated electronically by the outgoing video level.

Figure 13:
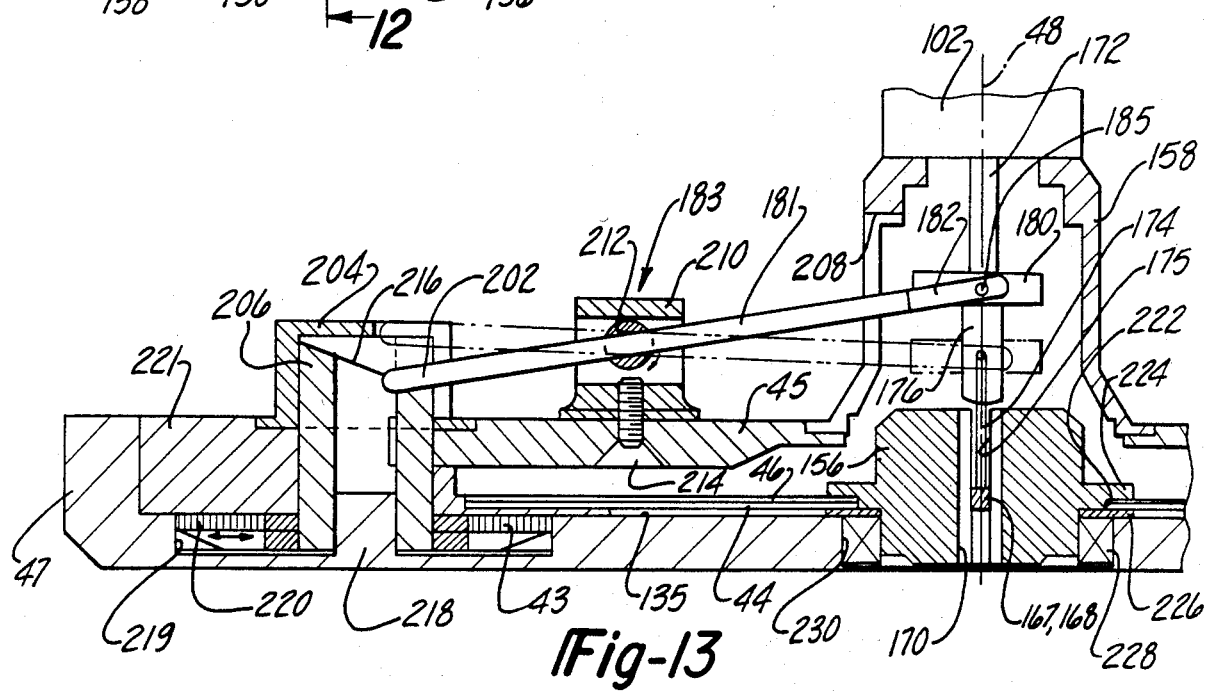
FIG. 13 is a cross sectional view of the shutter mechanism shown in FIG. 11, taken along line 13—13 of FIG. 11.

As best shown by FIGS. 12-14, the disks 44 and 46 are positioned on the hub 156 and situated for rotation in a recess 135 in the interior of housing 47. The disks 44 and 46 are positioned next to each other on flange 222 and rest against larger flange 224. The disks are held on the hub by washer 226 and bearing 228. The bearing 228 is seated in bore 230 in housing 47 and the hub is seated firmly in the bearing. The relationship of the bearing 228, washer 226, disks 44 and 46, and flange 224 holds the discs securely in position in the housing and on the hub, and yet allow them to rotate freely with the hub 156.

In operation, when the motor 102 is activated through appropriate circuitry and controls 103 by the camera operator, the drive shaft 173 with cylindrical shaft 172 attached thereto rotates the arrowhead-shaped blade accuator 174 which in turn rotates the hub 156 and the disks 44 and 46. As indicated earlier, blade 174 is positioned in axial slot 175 in hub 156.

Another arrangement for mounting the hub 156 for rotation in the shutter member 41 is shown in FIG. 15. The hub 156 is situated for rotation in bearing 240 which in turn is seated in recess 242 in back cover 45. Bearing 240 at the upper end of the hub as shown in FIG. 15 replaces the bearing 228 at the forward end of the hub in the embodiment shown in FIGS. 12-14. Together with bearing 240, however, it is also possible to use, although it is not necessary, self centering pivot bearing 244. If utilized, bearing 244 is positioned in recess 246 in housing 47 and holds conical end 248 of hub 156.

To aid in the timing of the shutter system, sensor 250 and control circuitry 252 are provided. The sensor is positioned in opening 254 in back cover 45 and is set up to "read" painted dot 256 on disk 46. The dot 256 is positioned at a prespecified and angular location from opening 58 on disk 46 (and hence from light admitting aperature 54). In the embodiment shown, the sensor 250 is positioned 180° from the opening. The sensor senses the dot each revolution of the disc and, through the control circuitry 252, insures that the video camera system is in the correct mode of operation when the disk openings 56 and 58 are in axial alignment with the video pickup 36. This arrangement compensates for any fluctuations in the speed of the motor 102, any phase-lock losses which might be encountered during adjustment of the shutter aperture, or any other changes or variations in the system which might affect the proper timing and orientation of the aperature 54 with respect to the positions of the lense and video pickup.

An alternate mechanism for adjusting the shutter aperature and the relative angular rotation of the rotating disk relative to one another is shown in FIGS. 16, 17 and 18. This embodiment differs from that described above relative to FIGS. 11–14 in the arrowhead-shaped accuator blade, the structure used to transmit the movement of the blade to the relative angular positions of the disks, the center openings of the disks, and changes in the hub to incorporate these differences.

The disks 300 and 302 are shown in their operating stacked relationship in FIG. 16. Each of the disks has a similar sized opening 304, 306 which together act as the light admitting aperature 308 in the same manner that openings 56, 58 in disks 44 and 46 form aperature 54 discussed earlier. The disks 300, 302 also have balance openings 310 and 312 which are similar in size, shape and function to the openings 110 and 112 in disks 44 and 46. The center openings 314 and 316 of the disks 300, 302 are circular and are adapted to fit on and be turned by hub 318.

The accuator blade 320 is not as thin as blade 174 discussed above and adjusts the relative angular relationship of the disks in a different manner, but the general purpose of the blade 320 is the same. The blade 320 is attached to a motor driveshaft 322 for rotation, fits inside and rotates the hub 318, and is adapted to move axially along axis 48 to adjust the size of the aperature 308. Brackets 330 and 332 are slidingly secured in channels 334, 335, 336 and 337 in blade 320 and protrude and move radially outwardly from the hub 318 in passageways 340 and 341. Pegs 343 and 344 extend from brackets 330 and 332 and fit into slanted openings 346, 347, 348 and 349 in the disks 300 and 302. Openings 346 and 349 are in disk 300 and openings 347 and 348 are in disk 302. These openings are arranged in pairs which overlap at a certain point and pegs 343 and 344 extend through them.

As the accuator blade 320 is moved axially along axis 48, the brackets and pegs move radially and slide within the slanted openings. As the pegs are forced radially outwardly, the slanted openings tend to cross which causes the disks 300, 302 to rotate relative to one another and thereby close the aperature 308. The process is repeated in the opposite direction for the aperature to be widened. The embodiment of FIGS. 16–18 does not utilize springs in the operation of the adjustment mechanism for the aperture and less possible loading of the motor 102 should result.

Other mechanisms for moving the accuator blade 174 axially in the slot 175 can also be utilized. For example, in place of the knob-mover-lever-yoke mechanism shown and described relative to FIGS. 11–14, it is also possible to provide a slotted ring attached to a slide mechanism for axial movement of the accuator blade. Such an alternate mechanism is shown in FIGS. 23–26.

The ring 281 has three elongated slots 283 positioned equidistantly around its circumference. The slots are angled approximately 30° from the horizontal (as illustrated by angle 285 in FIG. 25). The thrust bearing 287 is similar to thrust bearing 180 described earlier, but has three pegs 289 extending outwardly from it. The pegs 289 are positioned equidistantly around the circumference of the bearing and are slidingly positioned in the slots 283. The thrust bearing is secured to shaft 172 inside motor support housing 158. Lever 291 is attached to the outside of the ring 281 and extends through a slot 293 in housing 158. The lever is connected to a slide mechanism (not shown) on the exterior of the shutter mechanism housing 47, preferably along an edge thereof. Movement of the slide mechanism causes a corresponding rotation of the ring 281 around central axis 48. Rotation of the ring 281 due to the angled slots 283 in turn causes a direct axial movement of the accuator blade 174 along axis 48.

Figure 19:
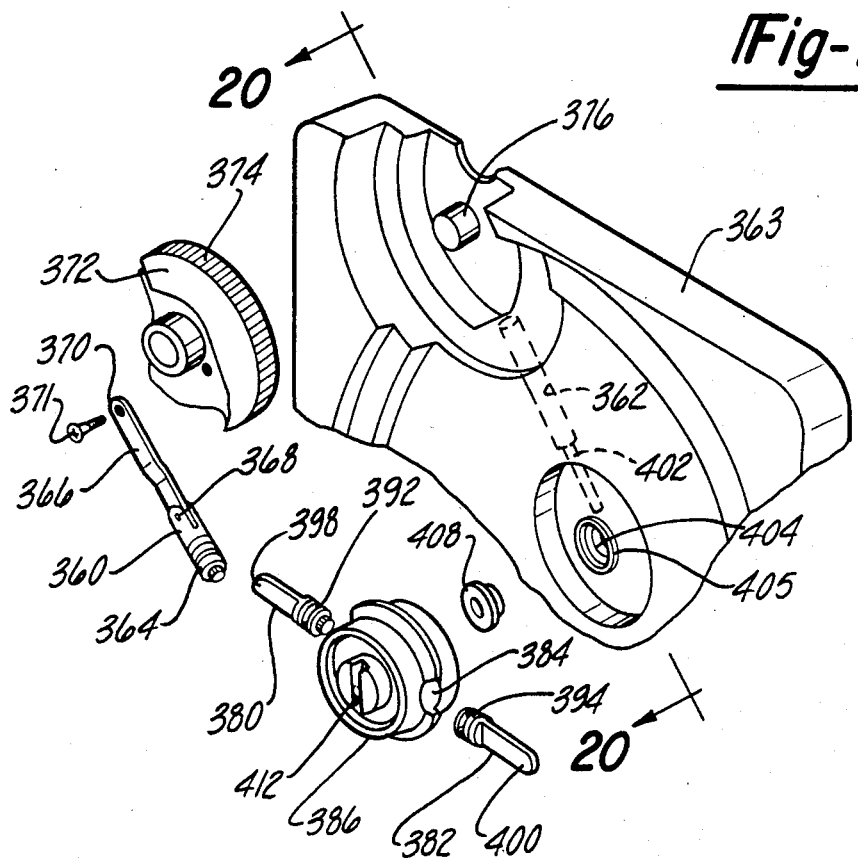
FIG. 19 illustrates another embodiment of the invention particularly a hydraulic system for adjusting the relative angular relationship of the shutter disks.
Figure 20:
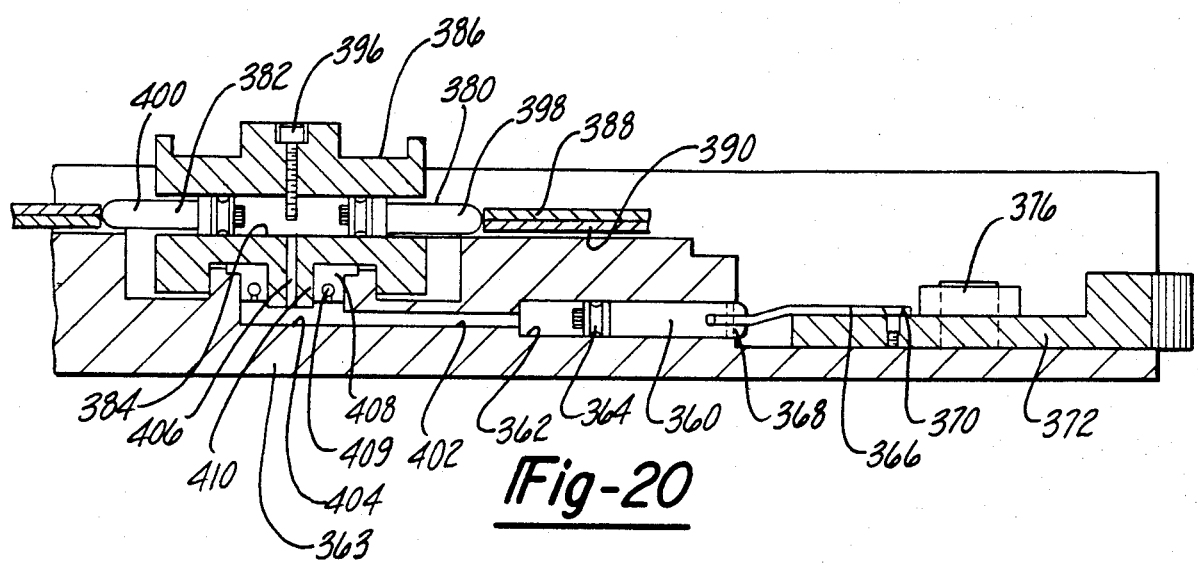
FIG. 20 is a cross sectional view of the shutter mechanism shown in FIG. 19, taken along line 20—20 of FIG. 19.

Still another embodiment for continuously adjusting the shutter aperature is illustrated in FIGS. 19 and 20. In this embodiment, a hydraulic mechanism is utilized which consists essentially of a master cylinder and double piston arrangement. The master cylinder comprises a small piston 360 slidably positioned in cylindrical bore 362 in housing 363. The piston 360 has a seal 364 thereon which sealingly engages the walls of the cylinder 362. A piston rod 336 is pivotably attached at one end 368 to the piston 360 and is pivotably attached at the other end 370 by screw 371 to an adjustment knob 372. The knob 372 has a knurled or ribbed edge 374 for manual rotation and is rotably situated on pivot peg 376.

A pair of pistons 380 and 382 are slidingly positioned in cylindrical bore 384 in hub 386. The pistons have seals 392 and 394 on their inner ends for sealingly engaging the walls of the cylinder 384. A screw 396 prevents the pistons 380 and 382 from touching or sliding past the center point in the cylinder, and also provides a port for "bleeding" the hydraulic system. The pistons have rounded ends 398 and 400 which mate with the "X" or "V"-shaped configurations of the disks 388 and 390. The "X" or "V"-shaped configurations are not shown in FIGS. 19 and 20, but they are the same as the ones described earlier relative to FIGS. 9 and 10. In this regard, the ends 398 and 400 of the pistons perform the same function and operate in a similar manner as the radially extended pins 167 and 168.

The hydraulic path between cylinders 362 and 384 includes passageway 402 and recess 404 in housing 363, and passageway 406 in hub 386. All of the portions of the hydraulic path are filled with an apprioruate hydraulic fluid. A seal 408 seals the joint between the hub 386 and the walls 405 of the recess 404. The seal 408 preferably is a spring seal with a small spring 409 embedded in it and utilized to insure sufficient sealing qualities to the seal. The end 410 of hub 386 is rotationally positioned in the seal 408 and the hub is rotated by a motor (not shown). The drive shaft of the motor is mechanically connected to slot 412 on the top of hub 386 and rotates it directly. The remaining features of the shutter mechanism shown in FIGS. 19 and 20 are the same as or the equivalent to those described earlier.

In operation, the shutter aperature is adjusted by manual rotation of the knob 372. Rotation of the knob 372 slides the piston 360 axially in its cylinder and causes the hydraulic fluid in the system to actuate the pistons 380 and 382 in the hub. Activation of the pistons 380 and 382 radially outwardly causes the ends 398 and 400 to be pushed or forced into the "X" or "V"-shaped configurations on the disks and thereby rotate the disks in opposite directions and close the light admitting aperature. When the aperature is desired to be made larger (and thus the shutter speed is desired to be slowed down), the knob 372 is rotated in the opposite direction. This slides the piston 360 toward the knob and in turn "pulls" the pistons 380 and 382 toward each other in cylinder 384 in the hub. Springs on the disks, such springs being similar to those described above relative to FIGS. 9 and 10, act to rotate the disks back toward their open-aperture position.

Figure 21:
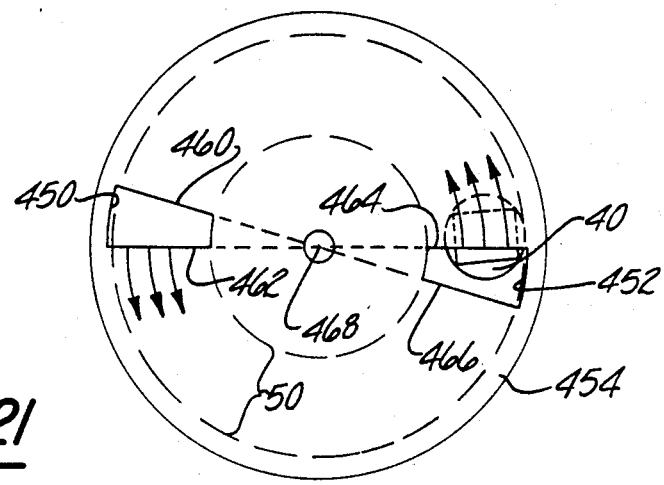
FIG. 21 is a plan view of a different shutter disk configuration.

While a presently preferred embodiment employs a single light admitting light aperture 54 for maximum hutter speed at a given exposure rate, the various mechanisms described above for continuously adjusting the shutter speed while the shutter is in motion are not limited to the single aperture embodiment. In general, the shutter speed adjustment mechanisms of the present invention are equally useful with multiple aperture shutters, such as the two-aperture shutter of FIG. 6. Furthermore, while the presently preferred aperture is of a particular shape and location, yet to be discussed, the shutter speed adjustment mechanisms are equally useable with other aperture shapes and locations such as the pie-shaped apertures 450 and 452 on disk mechanism 454, as illustrated in FIG. 21. As is apparent from FIG. 21, the side surfaces 460, 462, 464 and 466 of the two openings 450 and 452 fall along radians from the center 468 of the disk mechanism 454. Furthermore, the inventive concept of utilizing a single-aperture for maximized shutter speed may be expoloited with shutters having shapes and locations differing from the presently preferred shape and location shown in FIGS. 7, 8 and 22 and more fully explained below.

Figure 22:
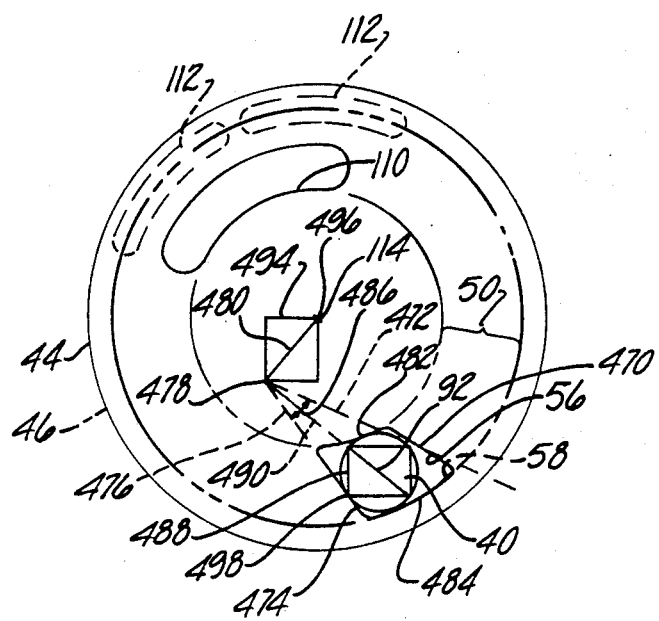
FIG. 22 is a diagrammatic view of a shutter disk showing the size, shape and location of the light admitting opening in greater detail.
Figure 23:
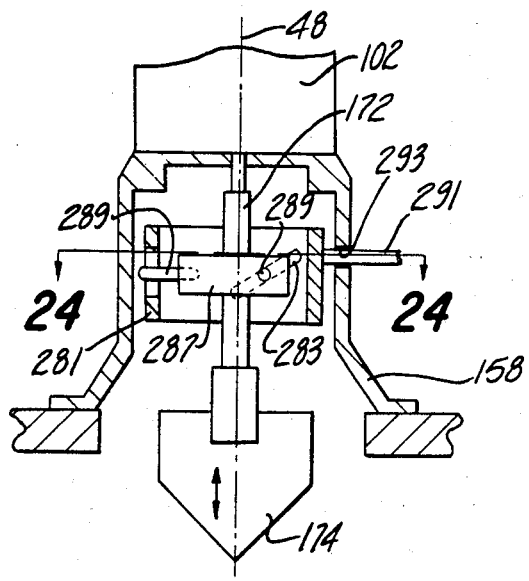
FIGS. 23-26 illustrate still another alternate mechanism for adjusting the shutter disks, with FIG. 24 being a cross-sectional view taken along lines 24—24 of FIG. 23.
Figure 24:
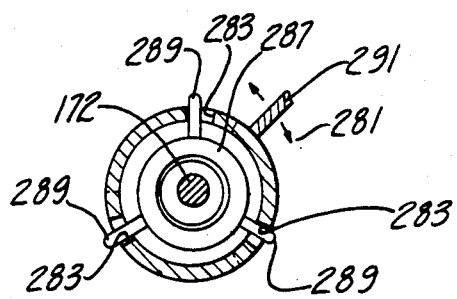
Figure 25:
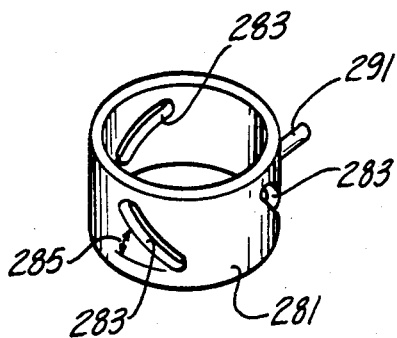
Figure 26:
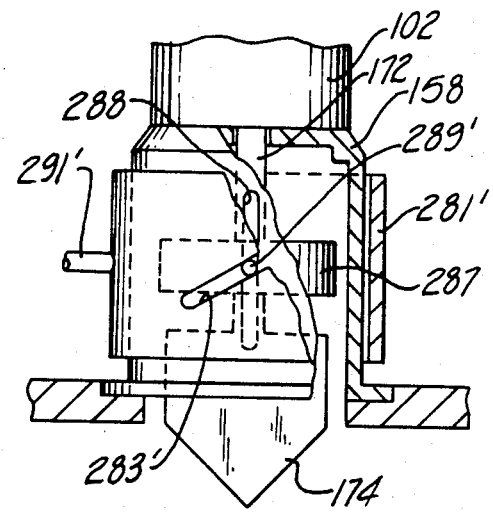

With reference to FIG. 22, the presently preferred aperture configuration will now be discussed. In order to provide uniform illumination across faceplate 40, the aperture defining openings 56 and 58 of disks 44 and 46, respectively, are formed with the unique shape shown in FIG. 22 at the location shown. (The same shaped openings are also shown in FIGS. 5-10.) Preferably openings 56 and 58 are identical, hence only opening 56 will be discussed herein. Opening 56 is bounded on a first side 470 by line 472 and bounded on a second side 474 by line 476. Lines 472 and 476 both emanate from a point 478 on the surface of disk 44. Point 478 is offset at a predetermined distance 480 from the geometric center 114 of the disk. (It will be recalled that the central axis of rotation 48 of the disks is through the geometric center 114.) Opening 56 is further bounded on third and fourth sides 482 and 484 by the concentric inner and outer boundaries of annular locus 50. Lines 472 and 476 define an acute angle 486.

In the presently preferred embodiment, the general size of opening 56 is largely determined by the size of faceplate 40, and more particularly determined by the size of the rectangular area 488 swept by the electron beam during the raster scan. For convenience, rectangular area 488 will be further described using the reference numerals used to describe the raster 84 of FIG. 4, where applicable. Point 478 is positioned at the predetermined distance 480 from geometric center 114 such that a line 400 bisecting angle 486 will coincide with one of the diagonals of rectangular area 488. In FIG. 22, the bisecting line 490 overlies diagonal line 92. Angle 486 is constructed so that lines 472 and 476 are roughly tangent to the circumference of pickup 40 when disk 44 is rotated to the position where bisecting line 490 and diagonal line 92 coincide.

The predetermined distance 480 is preferably equal in length to either of the diagonal lines 90 or 92 of the raster 84. The precise location of point 478 may be constructed by scribing an imaginary rectangle 494 on the surface of disk 44, the imaginary rectangle being the exact size and shape of rectangular area 488. The imaginary rectangle 494 touches geometric center 114 at corner 496 and is rotationally oriented 90 degrees with respect to rectangular are a 488. Point 478 is located at the corner of imaginary rectangle 494 diagonally opposite corner 496.

By constructing openings 56 and 58 in accordance with the above, a more even exposure is obtained. The resulting aperture configuration allows more light to reach faceplate 40 for a given shutter speed or exposure duration. This results in a more sensitive overall video system and allows the aperture to be comparatively smaller for a given lighting situation than with prior art shutters. The smaller aperture means a faster shutter speed, hence greater clarity and less blurring of fast moving objects.

Furthermore, since rotation of the disks in counterclockwise (as viewed from the lense side), the unique shape of openings 56 and 58 cause the lower left corner 498 of rectangular area 488 to be swept first with illumination. since this lower left corner is also first to be interrogated by the electron beam in the raster scanning pattern, the opical image is captured in the same sequence as it illuminates the pickup device. Hence any image decay occurs evenly across the entire pickup device.

While the invention has been described in its presently preferred embodiments, various changes in the details, materials, and arrangement of parts may be made by those skilled in the art within the principles and scope of the invetnion and defined in the appended claims.

What is claimed is:

1. A focal plane shutter for a video camera having a lense and pickup comprising:
   disk means disposed between said lense and said pickup for rotation about an axis;
   said disk means having an opening bounded on first and second sides by lines emanating from a point on said disk offset from said axis of rotation.

2. A shutter for a video camera having a pickup surface of a given diagonal dimension, in accordance with claim 1, wherein said point is offset from said axis a distance substantially equal to said diagonal dimension.

3. The shutter of claim 1 wherein said opening is further bounded on a third side by a first arc having radius originating at said axis.

4. The shutter of claim 3 wherein said opening is further bounded on a fourth side by a second arc having radius originating at said axis.

5. A shutter for a video camera having a pickup surface on which a raster is defined, in accordance with claim 1, wherein said point is located at a corner of an imaginary plane figure of substantially the same size and shape as said raster.

6. The shutter of claim 5 wherein said imaginary plane figure is orthogonally oriented with respect to said raster.

7. A shutter for a video camera having a pickup surface of a given peripheral size, in accordance with claim 1, wherein said opening is of a predetermined size determined in accordance with said peripheral size of said pickup surface.

8. The shutter of claim 1 wherein said pickup has a periphery and said lines bounding said first and second sides are approximately tangent to said periphery.

* * * * *

UNITED STATES PATENT AND TRADEMARK OFFICE
CERTIFICATE OF CORRECTION

PATENT NO. : 4,551,763

DATED : November 5, 1985

INVENTOR(S) : Steven L. Swinehart; Werner H. Kuhn

It is certified that error appears in the above-identified patent and that said Letters Patent is hereby corrected as shown below:

Col. 1, Line 16; "object" should be --objects--

Col. 1, Line 56; "electricaly" should be --electrical--

Col. 3, Line 48; "fo" should be --of--

Col. 3, Line 68; "betweeen" should be --between--

Col. 10, Line 19; "enbodiment" should be --embodiment--

Col. 10, Line 44; "remain" should be --remains--

Col. 11, Line 41; "hosuing" should be --housing--

Col. 11, Line 42; "axiallly" should be --axially--

Col. 13, Line 18; "162-164" should be --162-165--

Col. 15, Line 6; "disk" should be --disks--

Col. 16, Line 18; "336" should be --366--

Col. 16, Line 41; "apprioruate" should be --appropriate--

Col. 17, Line 5; "hutter" should be --shutter--

Col. 17, Line 22; "expoloited" should be --exploited--

Col. 18, Line 3; "are a" should be --area--

UNITED STATES PATENT AND TRADEMARK OFFICE
CERTIFICATE OF CORRECTION

PATENT NO. : 4,551,763  Page 2 of 2

DATED : November 5, 1985

INVENTOR(S) : Steven L. Swinehart; Werner H. Kuhn

It is certified that error appears in the above-identified patent and that said Letters Patent is hereby corrected as shown below:

Col. 18, Line 16; "in" should be --is--

Col. 18, Line 20; "since" should be --Since--

Col. 18, Line 22; "opical" should be --optical--

Signed and Sealed this

Fifteenth Day of July 1986

[SEAL]

Attest:

Attesting Officer

DONALD J. QUIGG

Commissioner of Patents and Trademarks